(12) United States Patent
Sunaga et al.

(10) Patent No.: US 7,676,312 B2
(45) Date of Patent: Mar. 9, 2010

(54) ACTUATOR CONTROLLER AND A METHOD FOR CONTROLLING SUCH AN ACTUATOR CONTROLLER

(75) Inventors: Hideki Sunaga, Tokyo (JP); Kaoru Tanaka, Tokyo (JP); Shuji Hojo, Tokyo (JP); Masaharu Tomiyama, Tokyo (JP); Hideyuki Takahashi, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 749 days.

(21) Appl. No.: 11/405,543

(22) Filed: Apr. 18, 2006

(65) Prior Publication Data

US 2006/0235578 A1 Oct. 19, 2006

(30) Foreign Application Priority Data

Apr. 19, 2005 (JP) ............................. 2005-120723

(51) Int. Cl.
*B60R 22/00* (2006.01)
*G05B 11/01* (2006.01)
*B60H 1/00* (2006.01)
*G06F 7/00* (2006.01)
(52) U.S. Cl. ........................ 701/49; 318/560; 454/75; 454/109; 701/36
(58) Field of Classification Search .................. 454/75, 454/109; 318/625
See application file for complete search history.

(56) References Cited

U.S. PATENT DOCUMENTS

| 4,704,690 | A | * | 11/1987 | Wason .......................... 702/72 |
| 6,178,947 | B1 | * | 1/2001 | Machida et al. ............. 123/396 |
| 6,345,603 | B1 | * | 2/2002 | Abboud et al. .............. 123/397 |
| 6,917,178 | B2 | * | 7/2005 | Takeuchi et al. ............ 318/625 |
| 2002/0129799 | A1 | * | 9/2002 | Wang et al. ............ 123/568.16 |

FOREIGN PATENT DOCUMENTS

| JP | 5-147427 A | | 6/1993 |
| JP | 05147427 A | * | 6/1993 |
| JP | 2005-073377 A | | 3/2005 |

\* cited by examiner

*Primary Examiner*—Thomas G Black
*Assistant Examiner*—Jeremy Bukowczyk
(74) *Attorney, Agent, or Firm*—Foley & Lardner LLP

(57) ABSTRACT

An actuator controller includes an actuator body to be driven in a predetermined driven range, an actuator driving unit; and a controller body for controlling the driven position of the actuator body. The controller body includes an instructing signal outputting zone configured to outputting a position instructing signal for instructing the driven position of the actuator body according to a bid, excluding arbitrary two bits among the predetermined bit counts, an normal direction forcedly driving signal for instructing a normal direction forcedly driving to drive the actuator body in a predetermined direction with the one of the arbitrary two bits, and a reverse direction forcedly driving signal for instructing a reverse direction forcedly driving to drive the actuator body in a direction reverse to the predetermined direction with the other arbitrary bit.

6 Claims, 4 Drawing Sheets

ACTUATOR CONTROLLER AND A METHOD FOR CONTROLLING SUCH AN ACTUATOR CONTROLLER

BACKGROUND OF THE INVENTION (1) Field of the Invention

The present invention relates to an actuator controller and a method for controlling such an actuator controller.

(2) Related Art Statement

Actuators, which are instructed as to its activation position to perform movement or rotation, are generally each equipped with a location sensor, such as an encoder or a potentiometer, that indicates the position of the actuator itself. Many actuator controllers each control the actuator such that the position indicated by the location sensor may be in conformity with a target one. See JP-A 2005-073377.

(3) Problems to be Solved by the Invention

The above actuator controller commonly makes a control, while positional signals of given bit counts are assigned over an driven range of the actuator.

Consider a case in which positional signals of 256 bit counts are assigned to the actuator having a rotational range of 256°, for example. In this case, an angle of 1° is assigned to one bit with respect to bit No. 1 to bit No. 256 over the rotational angle of 256°. The controller outputs a bit of a necessary number of rotations to the actuator, the actuator outputs a positional signal at the rotation position to the controller, and the controller controls the actuator so that these signals may be in conformity with each other. For example, if rotation is to be effected at an angle of 180°, the controller outputs bit No. 180 to the actuator so as to drive the actuator such that the positional signal of the actuator may be 180°.

In an air blower for an automobile, such an actuator is used to drive an open air introducing door which turns over air suction ports. In the state that the rotation angle of the actuator is "zero", an internal air-circulating operation is performed in which a car interior air is circulated, while the open air introducing door is closed to introduce no air from the outside of the car into the car interior. In the state that the rotation angle of the actuator is the largest, open air introducing operation is performed, in which open air outside the car is introduced into the car interior, while the open air introducing door is fully opened. Now, this case will be considered. In such an air blower, if the location sensor is out of order in the state that the rotation angle of the actuator is "zero" and the actuator is not moved even when the controller outputs a target position to the actuator, the actuator is not driven in the state that the open air introducing door is closed. Consequently, only the internal circulating operation is performed. In this case, a car glass may unfavorably become cloudy, if there is a large temperature difference between inside and outside of the car. This may cause poor visibility.

SUMMARY OF THE INVENTION

An object of the present invention is to provide an actuator controller which can forcedly drive an actuator body in a normal or reverse direction by one bit in a minimum count or one bit in a maximum count in predetermined bit counts.

Another object of the present invention is to provide a method for controlling such an actuator controller.

In order to solve the above problems, a first aspect of the present invention is directed to an actuator controller comprises:

an actuator body which is to be driven in a predetermined driven range and is equipped with a location sensor for outputting a positional signal depending upon a driven position within the driven range;

an actuator driving unit for receiving from outside a signal for driving the actuator body to the driven position in the form of an instruction signal of one of predetermined bit counts, receiving the positional signal from the actuator body and driving the actuator body based on the instruction signal and the positional signal; and a controller body for outputting said instruction signal to the actuator driving unit, receiving the positional signal from the actuator body, and controlling the driven position of the actuator body, wherein said controller body comprises an instructing signal outputting zone configured to outputting, as said instruction signal, a position instructing signal for instructing the driven position of the actuator body according to a bit excluding arbitrary two bits among said predetermined bit counts, an normal direction forcedly driving signal for instructing a normal direction forcedly driving to drive the actuator body in a predetermined direction with one of said arbitrary two bits, and a reverse direction forcedly driving signal foi instructing a reverse direction forcedly driving to drive the actuator body in a direction reverse to said predetermined direction with the other arbitrary bit. For example, of a minimum bit and a maximum bit among the predetermined bit counts may be selected "arbitrary two bits".

According to the above construction, the actuator body is driven to the instructed position based on the position instructing signal. Further, the actuator body can be driven in a normal or reverse direction by either one of the arbitrary two bits in the in the predetermined bit counts. Even if the actuator body is not driven when the location sensor gets out of order, the actuator body can be driven in a predetermined direction.

The following (1) to (3) are preferred embodiments of the actuator controller according to the present invention. Any combinations of (1) to (3) are also preferred embodiments of the actuator controller according to the present invention, unless any contradiction occurs.

(1) When the controller body outputs the position instructing signal to the actuator driving unit and if the controller body does not receive the positional signal corresponding to the position instructing signal from the actuator body within a first predetermined time period, and the controller body stops outputting the position instructing signal to the actuator driving unit and outputs said normal direction forcedly driving signal or the reverse direction forcedly driving signal.

According to the above construction, if the actuator body does not reach the instructed position within the first predetermined time period, the actuator body is forcedly driven in a predetermined direction, so that the actuator body is prevented from stopping at an inappropriate position. In other words, the actuator controller can forcedly drive an actuator of which driven position is controlled based on a location sensor, if the location sensor for the actuator gets out of order.

(2) The controller body stops outputting of the normal direction forcedly driving signal or the reverse direction forcedly driving signal after lapse of a second time period.

According to the above construction, since the forced rotation of the actuator body is stopped after the lapse of the second time period, a member or members connected to the actuator body can be prevented from being broken due to continuously forced rotation.

(3) When the controller body is outputting the normal direction forcedly driving signal or the reverse direction forcedly driving signal and if the controller body continuously receives continuous positional signals from the actuator body for a third predetermined time period, outputting the normal direction forcedly driving signal or the reverse direction forcedly driving signal is stopped.

According to the above construction, it may be that if the actuator body comes to be normally rotated during the forced rotation, the forced rotation is stopped, and the actuator body is returned to the normal driving.

A second aspect of the present invention is directed to a method for controlling an actuator controller, said controller comprises:

an actuator body which is to be driven in a predetermined driven range and is equipped with a location sensor for outputting a positional signal depending upon a driven position within said driven range;

an actuator driving unit for receiving from outside a signal for driving the actuator body to said driven position in the form of an instruction signal of one of predetermined bit counts, receiving said positional signal from the actuator body and driving the actuator body based on the instruction signal and the positional signal; and a controller body for outputting said instruction signal to the actuator driving unit, receiving the positional signal from the actuator body, and controlling the driven position of the actuator body, wherein said controlling method uses, as said instructing signal, a position instructing signal for instructing the driven position of the actuator body according to a bit, excluding arbitrary two bits among said predetermined bit counts, an normal direction forcedly driving signal for instructing a normal direction forcedly driving to drive the actuator body in a predetermined direction with said one of arbitrary two bits in the minimum count, and a reverse direction forcedly driving signal for instructing a reverse direction forcedly driving to drive the actuator body in a direction reverse to said predetermined direction with the other arbitrary bit. For example, of a minimum bit and a maximum bit among the predetermined bit counts may be selected "arbitrary two bits".

According to the above construction, the actuator body is driven to the instructed position based on the position instructing signal. Further, the actuator body can be driven in a normal or reverse direction by either one of the arbitrary two bits in the predetermined bit counts. Even if the actuator body is not driven when the location sensor gets out of order, the actuator body can be driven in a predetermined direction.

The following (1) to (3) are preferred embodiments of the actuator controller-controlling method according to the present invention. Any combinations of (1) to (3) are also preferred embodiments of the actuator controller-controlling method according to the present invention, unless any contradiction occurs.

(1) When the controller body outputs the position instructing signal to the actuator driving unit and if the controller body does not receive the positional signal corresponding to the position instructing signal from the actuator body within a first predetermined time period, and the controller body stops outputting the position instructing signal to the actuator driving unit and outputs said normal direction forcedly driving signal or the reverse direction forcedly driving signal.

According to the above construction, if the actuator body does not reach the instructed position within the first predetermined time period, the actuator body is forcedly driven in a predetermined direction, so that the actuator body is prevented from stopping at an inappropriate position.

(2) The controller body stops outputting of the normal direction forcedly driving signal or the reverse direction forcedly driving signal after lapse of a second time period.

According to the above construction, since the forced rotation of the actuator body is stopped after the lapse of the second time period, a member or members connected to the actuator body can be prevented from being broken due to continuously forced rotation.

(3) When the controller body is outputting the normal direction forcedly driving signal or the reverse direction forcedly driving signal and if the controller body continuously receives continuous positional signals from the actuator body for a third predetermined time period, outputting the normal direction forcedly driving signal or the reverse direction forcedly driving signal is stopped.

According to the above construction, it may be that if the actuator body comes to be normally rotated during the forced rotation, the forced rotation is stopped, and the actuator body is returned to the normal driving.

EFFECTS OF THE PRESENT INVENTION

According to the present invention, the actuator controller and the method of controlling the actuating controller which can forcedly drive the actuator of which driven position is controlled based on the operated position even if the location sensor for the actuator gets out of order.

Japanese patent application No. 2005-120723 filed on Apr. 19, 2005 of which convention priority is claimed in this application is entirely incorporated hereinto by reference.

BRIEF DESCRIPTION OF THE DRAWINGS

For a better understanding of the present invention, reference is made to the attached drawings, wherein.

DETAILED DESCRIPTION OF THE INVENTION

Embodiments of the actuator controller according to the present invention will be explained with reference to the drawings.

First Embodiment

Figure 1:
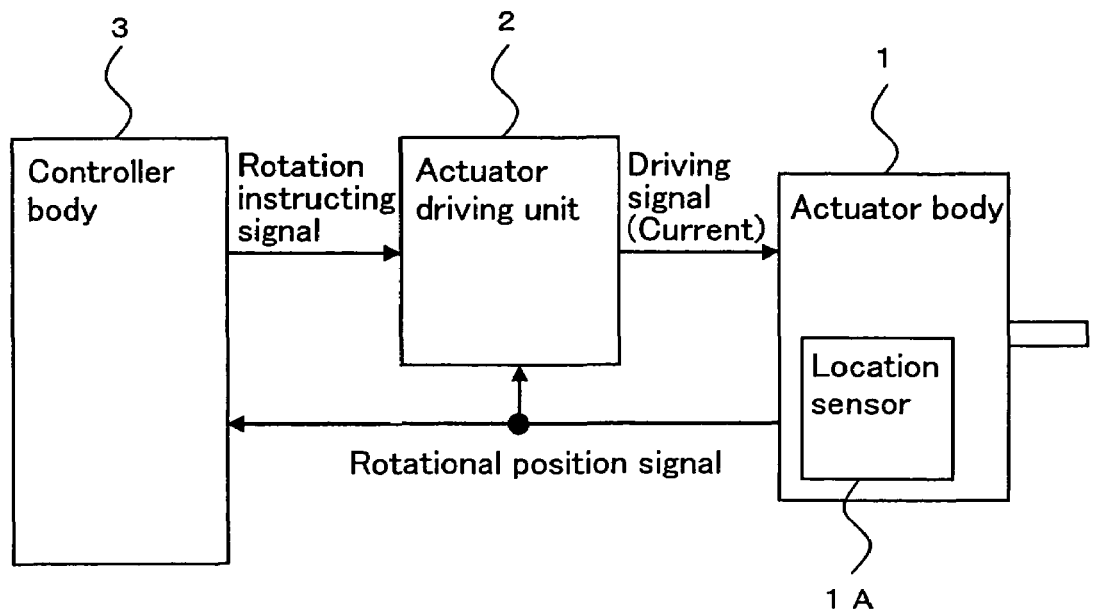
FIG. 1 is a block diagram of a first embodiment of the actuator controller according to the present invention.

FIG. 1 is a block diagram of a first embodiment of the actuator controller according to the present invention. In this embodiment, the embodiment will be explained with respect to an automobile air blower using a rotary type actuator.

In the following explanation, there are relationship between (1) to (5) and wordings in the claims, respectively.

(1) a rotation positional signal vs. positional signal (2) a rotation instructing signal vs. instruction signal (3) a rotation position instructing signal vs. position instructing signal (4) a normal direction forced rotational signal vs. normal direction forcedly driving signal (5) reverse direction forced rotational signal vs. reverse direction forcedly driving signal An actuator body 1 is equipped with a location sensor 1A for outputting rotation positional signals. The actuator body is rotated upon receipt of a driving signal (electric current) from an actuator driving unit 2 connected electrically to the actuator body, and the location sensor outputs a rotational positional signal.

The actuator driving unit 2 receives a rotation instructing signal from the controller body 3 electrically connected to the actuator body 2, and outputs a driving signal (electric current) to the actuator body 1. The actuator driving unit 2 also receives a rotational positional signal from the location sensor 1A, and drives the actuator body 1 by regulating the driving signal (electric current) so that the actuator body 1 may be turned to the rotational position corresponding to the rotation instructing signal received from the controller unit 3.

The controller unit 3 outputs to the actuator driving unit 2 a rotation instructing signal to turn the actuator body 1, and also receives a rotational positional signals from the location sensor 1A.

Figure 2:
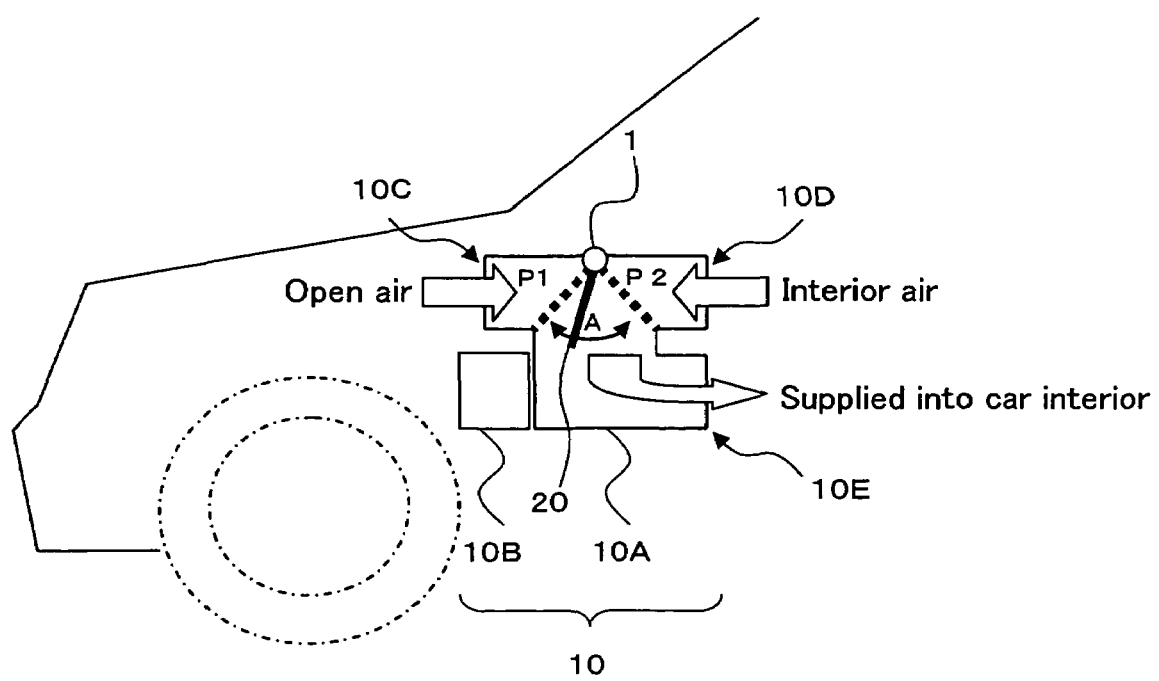
FIG. 2 is a construction diagram of the first embodiment of the actuator controller according to the present invention.

FIG. 2 schematically shows the construction of an air blower of an automobile.

The air blower 10 comprises an air blower body 10A and an air blower fan 10B.

The air blower body 10A is equipped with a suction port 10C communicated with a car exterior and a suction port 10D communicating with a car interior. An open air introducing door 20 is provided downstream of the suction ports 10C and 10D. As the actuator body 1 is turned, the open air introducing door 20 is turned in a direction of an arrow A in FIG. 2. The air blower fan 10B is provided downstream of the open air-introducing door 20 and in a forward direction of the vehicle. The air taken in by the suction port 10C and 10D is fed into the car interior through the air blowing port 10E communicating with the car interior.

When the open air introducing door 20 is located at a position P1 in FIG. 2, the suction port 10C is closed with the open air introducing door 20. Therefore, the air blower body 10A takes in car interior air (hereinafter referred to as "interior air") through the suction port 10D, and the air blow fan 10B supplies it into the car interior through the air blow port 10E.

On the other hand, when the open air introducing door 20 is located at a position P2 in FIG. 2, the suction port 10D is closed with the open air introducing door 20. Therefore, the air blower body 10A takes in open air (hereinafter referred to as "open air") through the air suction port 10C, and the air blow fan 10B supplies into the car interior it through the air blow port 10E.

If the open air introducing door 20 is located between P1 and P2 in FIG. 2, open air and interior air are taken through the suction ports 10C and 10D in respective amounts depending upon the positions of the open air introducing door 20 from the suction ports 10C and 10D, and the air is supplied into the car interior through the blower port 10E with the air blower fan 10B after the open air and the interior air are mixed together inside the air blower body 10A.

Figure 3:
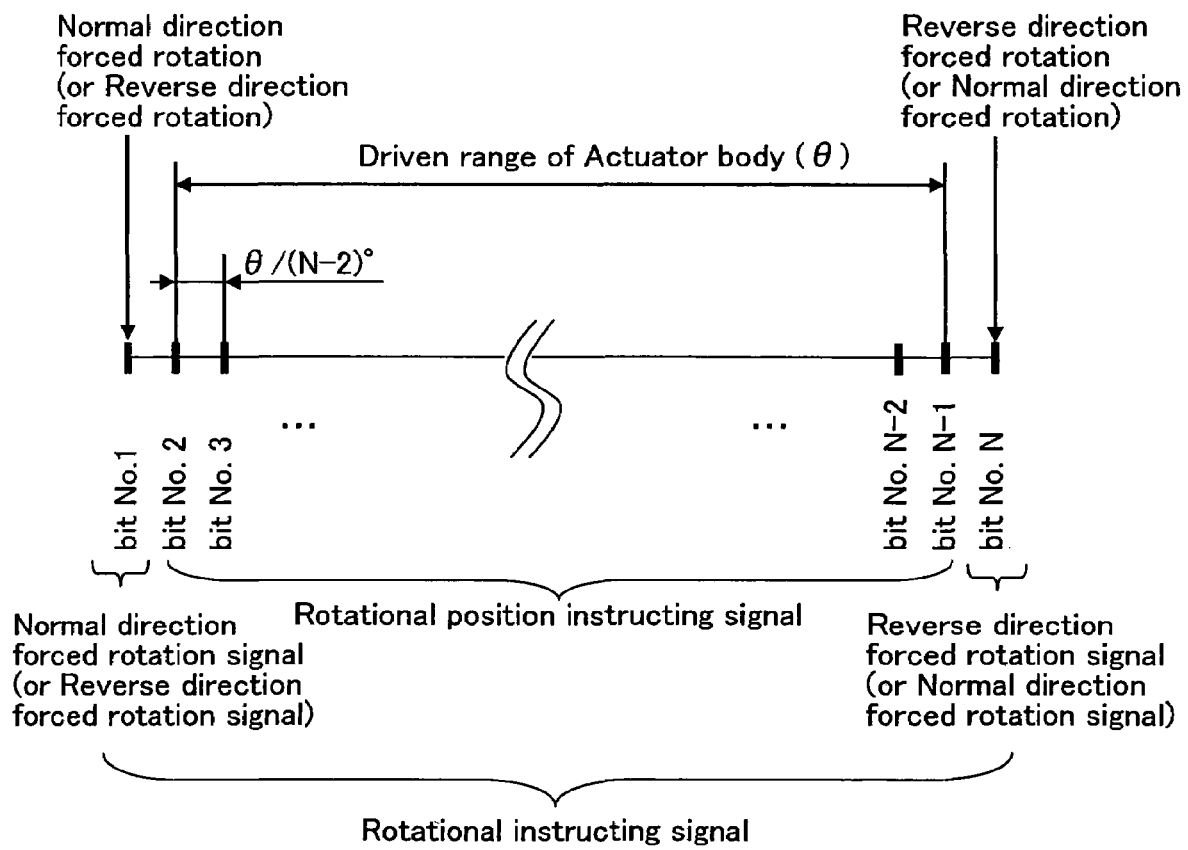
FIG. 3 is an explanatory diagram for illustrating the contents of rotation positional signals of the first embodiment of the actuator controller according to the present invention.

FIG. 3 is a schematic diagram illustrating the contents of rotation instructing signals which the controller body 3 output to the actuator driving unit 2.

The controller body 3 outputs a rotational position of θ° in the form of a N-bit signal in a rotational range over which the actuator body 1 is turned.

A second bit to an (N−1)th bit are used as rotational position instructing signals for instructing rotational positions of the actuator body 1. Therefore, an angle of one bit for the rotational position instructing signal is [θ/(N−2)]°.

One bit in the minimum count is used as a normal direction forcedly rotating signal to turn the actuator body 1 so that the suction port 10C may be closed with the open air introducing door 20 (Position P1 in FIG. 2).

The Nth bit in the maximum count is used as a reverse direction forcedly driving signal to turn the actuator body 1 so that the suction port 10D may be closed with the open air introduction door 20 (Position P2 in FIG. 2).

Figure 4:
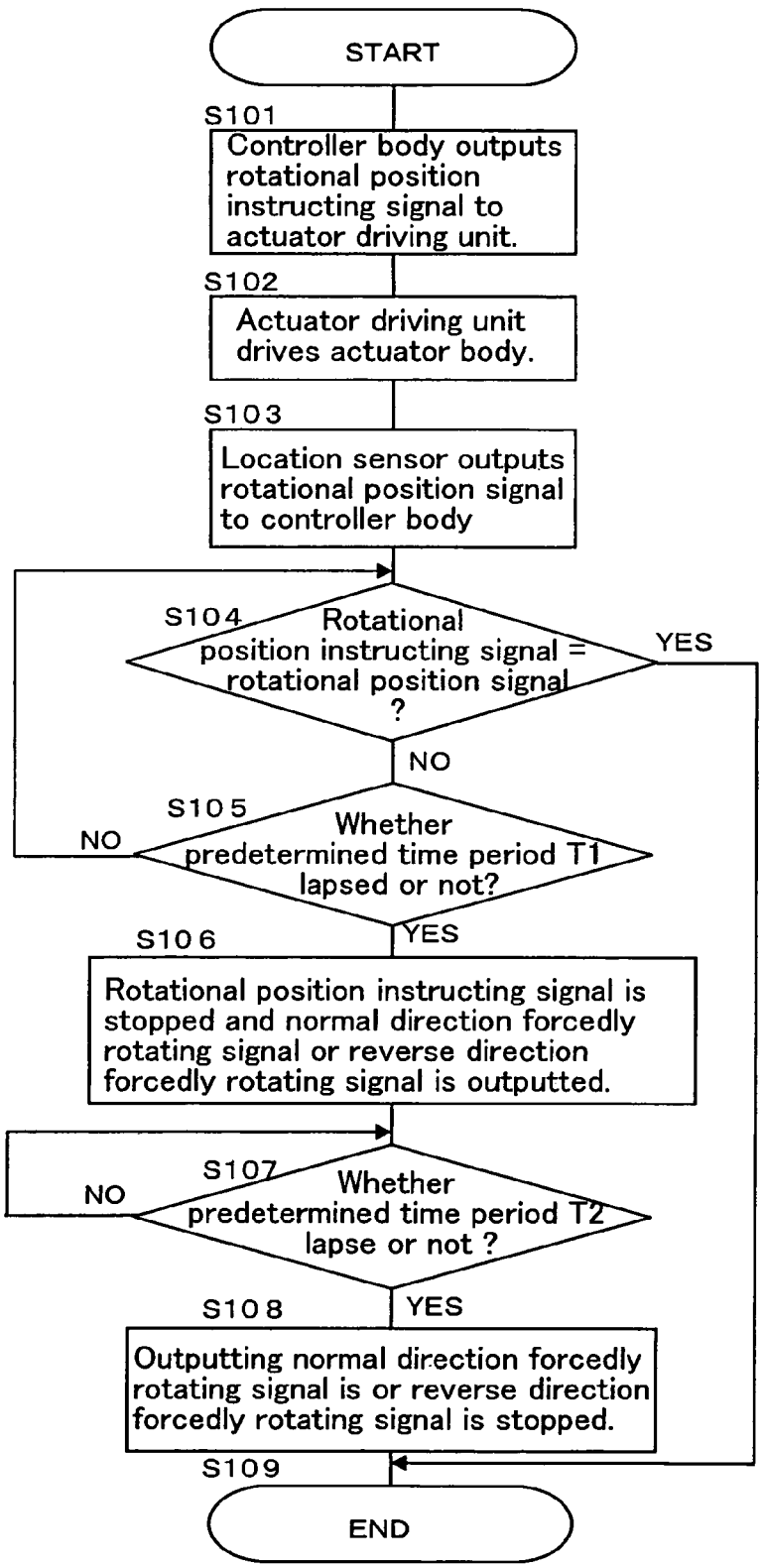
FIG. 4 is a flow chart of the first embodiment of the actuator controller according to the present invention.

Next, the function of the actuator controller will be explained by using a flow chart in FIG. 4.

In Step S101, the controller body 3 outputs a rotational position instructing signal to the actuator driving unit 2. Thereafter, the process goes to Step S102.

In Step S102, the actuator driving unit 2 drives the actuator body 1. The actuator driving unit 2 outputs a driving signal (electric current) to the actuator body 1 based on the rotational position instructing signal received from the controller body 3, thereby driving the actuator body 1. In addition, the actuator driving unit 2 receives a rotational positional signal from the location sensor 1A of the actuator body 1, and drives the actuator body 1 by adjusting the driving signal (amount of electric current) such that the rotational position instructing signal may be equal to the rotational positional signal. Then, the process goes to Step S103.

In Step S103, the location sensor 1A outputs the rotational positional signal to the controller body 3. Then, the process goes to Step S104.

In Step S104, judgment is made by comparing the rotational position instructing signal with the rotational positional signal. If the rotational position instructing signal is in conformity with the rotational positional signal, it is judged that the positional sensor 1A normally works. Thus, the process goes to Step S109 to terminate the present works. On the other hand, if the rotational position instructing signal is not in conformity with the rotational positional signal, the process goes to Step S105.

In Step S105, it is judged whether a predetermined time period T1 lapsed or not after the controller body 3 outputs the rotational position instructing signal to the actuator driving unit 2. If the predetermined time period T1 did not lapse, the process returns to Step S104. On the other hand, if more than the predetermined time period T1 lapsed but the rotational position instructing signal is not in conformity with the rotational positional signal, it is judged that the actuator body 1 is not properly controlled by the rotation position instructing signal. The process goes to Step 106.

In Step S106, the controller body 3 stops outputting of the rotational position instructing signal, and outputs the Nth bit of the reverse direction forcedly driving signal to the actuator driving unit 2. When the actuator driving unit 2 receives this signal, it supplies electric current to the actuator body 1 so as to forcedly rotate the actuator body 1 in a direction in which the suction port 10D is closed with the open air introducing door 20 (Position P2 in FIG. 2). Then, the process goes to Step S107.

In Step S107, it is judged whether a predetermined time period T2 lapsed or not after the controller body 3 outputs the reverse direction forcedly rotational signal to the actuator driving unit 2. The actuator body 1 is continuously forcedly turned in the reverse direction until the predetermined time period T2 lapses. At a point of time when the predetermined time period T2 lapsed, the process goes to Step S108 where the reverse direction forcedly rotation of the actuator body 1 is stopped, and the present operation is terminated at Step S109.

For example, consider that the location sensor 1A gets out of order, the actuator body 1 is not turned even if the controller body 3 outputs a rotational position instructing signal, and the suction port 10C is closed with the open air introducing door 20 (Position P1 in FIG. 2). Even in this case, according to the above operations, the open air introducing door 20 can be shifted to the fully opened state (Position P2 in FIG. 2) by forcedly turning the actuator body 1 through outputting the reverse direction forcedly rotational signal from the controller body 3. This operation can introduce open air, so that even if there is a large temperature difference between inside and outside the car, poor visibility due to clouding of the glass can be prevented.

The normal direction forced rotation or the reverse direction forced rotation is stopped at the point of time when the time period T2 lapsed. Therefore, it is possible to prevent a trouble in which the actuator body 1 is continuously forcedly turned, and excessive actuation load of the actuator body 1 is applied to the member(s) connected to the actuator body 1 and in this case to the open air introduction door 20, thereby breaking the member(s).

Embodiment 2

Figure 5:
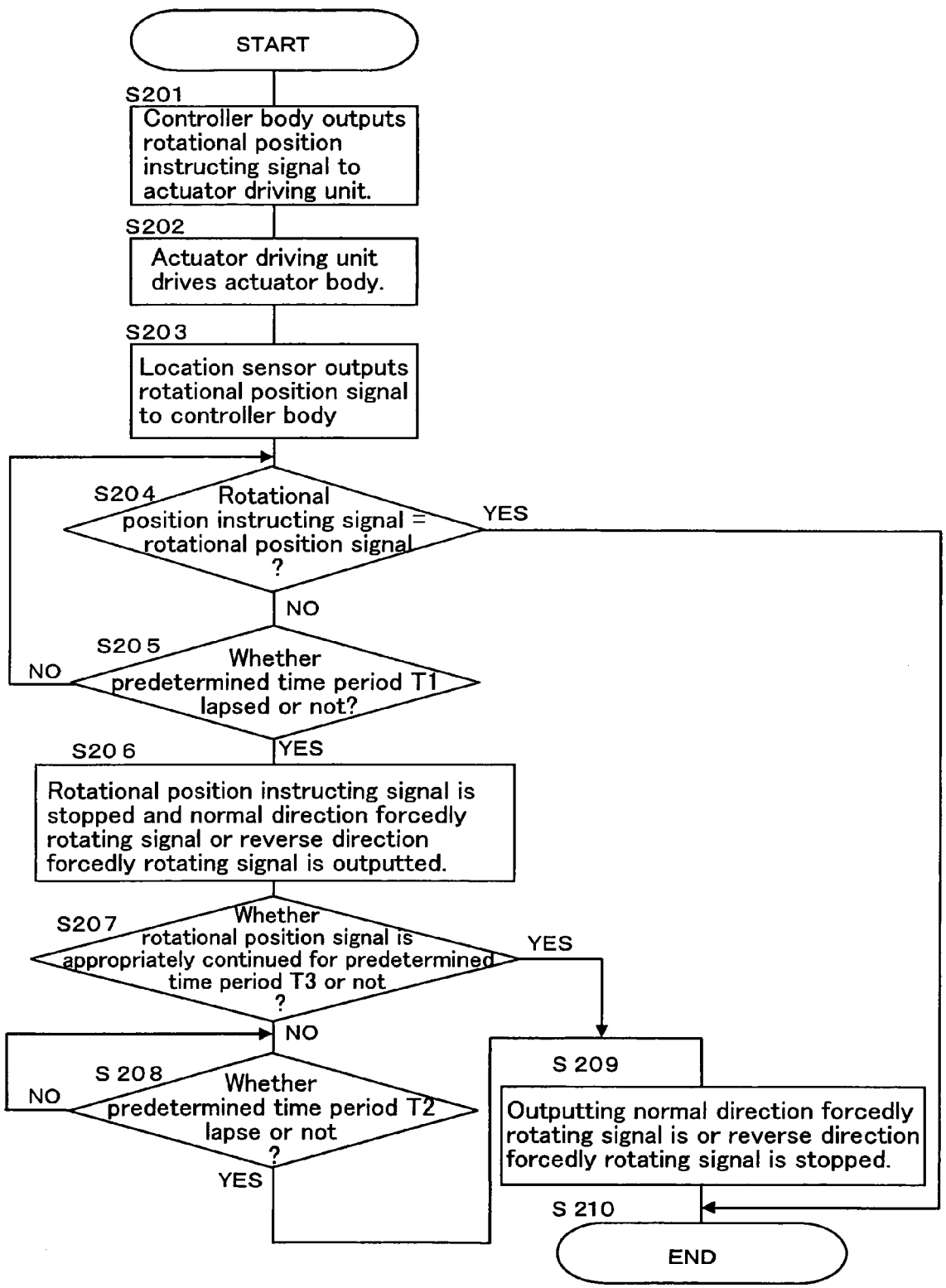
FIG. 5 is a flow chart of a second embodiment of the actuator controller according to the present invention.

FIG. 5 shows the flow chart of a second embodiment according to the present invention.

In the present embodiment, a reverse direction forced rotation is stopped in the first embodiment if the controller body 3 continuously receives correct rotational positional signals from the location sensor 1A for not shorter than a predetermined time period T3 during the reverse direction forced rotation.

In the following explanation, (1) a rotation positional signal, (2) a rotation instructing signal, (3) a rotation position instructing signal, (4) a normal direction forced rotational signal, and (5) reverse direction forced rotational signal have the above-mentioned relationship to the wordings in the claims.

In Step S201, the controller body 3 outputs a rotational position instructing signal to the actuator driving unit 2. Thereafter, the process goes to Step S202.

In Step 202, the actuator driving unit 2 drives the actuator body 1. The actuator driving unit 2 outputs a driving signal (electric current) to the actuator body 1 based on the rotational position instructing signal received from the controller body 3, thereby driving the actuator body 1. In addition, the actuator driving unit 2 receives a rotational positional signal from the location sensor 1A of the actuator body 1, and drives the actuator body 1 by adjusting the driving signal (amount of the electric current) such that the rotational position instructing signal may be equal to the rotational positional signal. Then, the process goes to Step S203.

In Step S203, the location sensor 1A outputs the rotational positional signal to the controller body 3. Then, the process goes to Step S204.

In Step S204, judgment is made by comparing the rotational position instructing signal with the rotational positional signal. If the rotational position instructing signal is in conformity with the rotational positional signal, it is judged that the positional sensor 1A normally works. Thus, the process goes to Step S209 to terminate the present works. On the other hand, if the rotational position instructing signal is not in conformity with the rotational positional signal, the process goes to Step S205.

In Step S205, it is judged whether a predetermined time period T1 lapsed or not after the controller body 3 outputs the rotational position instructing signal to the actuator driving unit 2. If the predetermined time period T1 did not lapse, the process returns to Step S204. On the other hand, if more than the predetermined time period T1 or longer lapsed but the rotational position instructing signal is not in conformity with the rotational positional signal, it is judged that the actuator body 1 is not properly controlled by the rotation position instructing signal. The process goes to Step 206.

In Step S206, the controller body 3 stops outputting of the rotational position instructing signal, and outputs the N bit of the reverse direction forcedly driving signal to the actuator driving unit 2. When the actuator driving unit 2 receives this signal, it supplies electric current to the actuator body 1 so as to forcedly rotate the actuator body 1 in a direction in which the suction port 10D is closed with the open air introducing door 20 (in P2-state in FIG. 2). Then, the process goes to Step S207.

In Step S207, it is judged whether the controller body 3 continuously receives continuous rotational positional signals for not less than a predetermined time period T3 during the reverse direction forced rotation or not.

The controller body 3 takes in rotational positional signals from the location sensor 1A during the reverse direction forced rotation. If the reverse direction forced rotation is being performed due to failure of the location sensor 1A, the rotational positional signals of the location sensor 1A are intermittent, or the rotational positional signals themselves are not obtained. On the other hand, even if the actuator body 1 is not turned because dust clogs a rotational portion of the actuator body 1, for example, the reverse direction forced rotation is performed when the rotational position instructing signal is not in conformity with the rotational positional signal within the predetermined time period T1. In this case, if the actuator body 1 begins to be normally turned because of removal of the dust during the reverse direction forced rotation, the outputs from the location sensor 1A continuously change. For this reason, the state of the output signals from the location sensor 1A during the reverse direction forced rotation is inspected. If the outputs from the location sensor 1A exhibit continuous change continuously for not less than the predetermined time period T3, it is judged that the actuator body 1 was not normally turned temporally because the rotation portion of the actuator body 1 is clogged with dust instead of a real failure of the location sensor. Thus, the process goes to Step S209 where the reverse direction forced rotation is stopped.

In Step S208, it is judged whether the predetermined time period T2 lapsed or not after the controller body 3 outputs the reverse direction forcedly rotational signal to the actuator driving unit 2. The actuator body 1 is continuously forcedly turned in the reverse direction until the predetermined time period T2 lapsed. At a point of time when the predetermined time period T2 lapsed, the process goes to Step S209 where the reverse direction forcedly rotation of the actuator body 1 is stopped, and the present operation is terminated at Step S210.

The same effects as in the first embodiment are obtained by the above operations.

If the actuator body 1 is not normally turned for the reason that the actuator body is clogged with dust or the like without abnormality of the location sensor 1A, the reverse direction forced rotation is performed. If the actuator body 1 begins to be normally turned during the reverse direction forced rotation, the actuator body can be returned to the normal operation by stopping the reverse direction forced rotation.

Although the embodiments of the present invention have been explained in detail with reference to the attached drawings, they are merely illustrative of the invention, but the invention is not limited to the constructions of the embodiments only. Therefore, as a matter of course, any modifications, changes and variations in design will be encompassed by the present invention so long as they don't depart from the spirit or scope of the invention.

For example, the actuator body 1 is not limited to one which is used for driving the open air introducing door 20 of the air blower in the automobile. The actuator body may be used in any application in which it performs an intended function through being turned in a predetermined rotation range.

The normal direction forced rotation and the reverse direction forced rotation are not limited to those direction as indicated in the embodiments, but the directions may be arbitrarily set.

Further, the actuator body 1 is not limited to the rotational type, but it may be one that linearly moves.

The invention claimed is:

1. An actuator controller, comprising:
   an actuator body which is to be driven in a predetermined driven range and is equipped with a location sensor for outputting a positional signal depending upon a driven position within said driven range;
   an actuator driving unit for receiving, from outside, a signal for driving the actuator body to said driven position in the form of an instruction signal of a predetermined bit count, receiving said positional signal from the actuator body and driving the actuator body based on the instruction signal and the positional signal; and
   a controller body for outputting said instruction signal to the actuator driving unit, receiving the positional signal from the actuator body, and controlling the driven position of the actuator body,
   wherein said controller body comprises an instructing signal outputting zone which is configured to output, as said instruction signal, a position instructing signal for instructing the driven position of the actuator body according to a bit, excluding arbitrary two bits among said predetermined bit count, a normal direction forcedly driving signal for instructing a normal direction forcedly driving to drive the actuator body in a predetermined direction with one of said arbitrary two bits, and a reverse direction forcedly driving signal for instructing a reverse direction forcedly driving to drive the actuator body in a direction reverse to said predetermined direction with the other arbitrary bit,
   wherein said actuator driving unit receives said position instructing signal from said controller body and drives said actuator body based on said position instructing signal, and when said actuator body is not normally turned, said actuator driving unit receives said normal direction forcedly driving signal or said reverse direction forcedly driving signal from said controller body, and forcedly drives said actuator body in said normal direction or said reverse direction,
   wherein when the controller body outputs the position instructing signal to the actuator driving unit and if the controller body does not receive the positional signal corresponding to the position instructing signal from the actuator body within a first time period that is a predetermined time period, the controller body stops outputting the position instructing signal to the actuator driving unit and outputs said normal direction forcedly driving signal or the reverse direction forcedly driving signal, and
   wherein the controller body stops outputting of the normal direction forcedly driving signal or the reverse direction forcedly driving signal after a lapse of a second time period.

2. The actuator controller set forth in claim 1, wherein when the controller body is outputting the normal direction forcedly driving signal or the reverse direction forcedly driving signal and if the controller body continuously receives continuous positional signals from the actuator body for a second time period that is a predetermined time period, outputting the normal direction forcedly driving signal or the reverse direction forcedly driving signal is stopped.

3. The actuator controller set forth in claim 1, wherein when the controller body is outputting the normal direction forcedly driving signal or the reverse direction forcedly driving signal and if the controller body continuously receives continuous positional signals from the actuator body for a third time period that is a predetermined time period, outputting the normal direction forcedly driving signal or the reverse direction forcedly driving signal is stopped.

4. A method for controlling an actuator controller, comprising:
   driving an actuator body in a predetermined driven range, wherein the actuator body is equipped with a location sensor for outputting a positional signal depending upon a driven position within said driven range;
   receiving, with an actuator driving unit, from outside, a signal for driving the actuator body to said driven position in the form of an instruction signal of a predetermined bit count, receiving said positional signal from the actuator body and driving the actuator body based on the instruction signal and the positional signal; and
   outputting, with a controller body, said instruction signal to the actuator driving unit, receiving the positional signal from the actuator body, and controlling the driven position of the actuator body,
   wherein said controlling method uses, as said instruction signal, a position instructing signal for instructing the driven position of the actuator body according to a bit, excluding arbitrary two bits among said predetermined bit count, a normal direction forcedly driving signal for instructing a normal direction forcedly driving to drive the actuator body in a predetermined direction with one of said arbitrary two bits, and a reverse direction forcedly driving signal for instructing a reverse direction forcedly driving to drive the actuator body in a direction reverse to said predetermined direction with the other arbitrary bit,
   wherein when said position instructing signal is output from said controller body, said actuator driving unit drives said actuator body based on said position instructing signal, and when said actuator body is not normally turned, said normal direction forcedly driving signal or said reverse direction forcedly driving signal is output from said controller body, and said actuator driving unit forcedly drives said actuator body in said normal direction or said reverse direction,
   wherein when the controller body outputs the position instructing signal to the actuator driving unit and if the controller body does not receive the positional signal corresponding to the position instructing signal from the actuator body within a first time period that is a predetermined time period, the controller body stops outputting the position instructing signal to the actuator driving unit and outputs said normal direction forcedly driving signal or the reverse direction forcedly driving signal, and wherein the controller body stops outputting of the normal direction forcedly driving signal or the reverse direction forcedly driving signal after a lapse of a second time period.

5. The controlling method set forth in claim 4, wherein when the controller body is outputting the normal direction forcedly driving signal or the reverse direction forcedly driving signal and if the controller body continuously receives continuous positional signals from the actuator body for a second time period that is a predetermined time period, outputting the normal direction forcedly driving signal or the reverse direction forcedly driving signal is stopped.

6. The controlling method set forth in claim 4, wherein when the controller body is outputting the normal direction forcedly driving signal or the reverse direction forcedly driving signal and if the controller body continuously receives continuous positional signals from the actuator body for a third time period that is a predetermined time period, outputting the normal direction forcedly driving signal or the reverse direction forcedly driving signal is stopped.

* * * * *